UNITED STATES PATENT OFFICE.

REVERE M. BREINIG, OF BROOKLYN, NEW YORK.

PROCESS OF MANUFACTURING PAINTS.

SPECIFICATION forming part of Letters Patent No. 304,902, dated September 9, 1884.

Application filed June 30, 1883. (Specimens.)

*To all whom it may concern:*

Be it known that I, REVERE M. BREINIG, a citizen of the United States, and a resident of Brooklyn, in the county of Kings and State of New York, have invented a new and useful improvement in the art of making paints and similar compounds, which consists in using any suitable pigment—such, for instance, as carbonate of lead, oxide of zinc, whiting, silicic acid, (pure silex,) feldspar, emery, infusorial earth, talc, clay, oxide of iron, ochers, starch, flour, ground corn, and all the various natural, vegetable, mineral, chemically-manufactured, opaque, transparent, or artificially-colored pigments used in the art of manufacturing paints, filler, sizing, or surfacing compounds—by which process I either severally or collectively chemically combine them with any metallic salt—such, for example only, as sugar of lead, nitrate of lead, nitrate of copper, muriate of manganese, and a new and useful compound resulting therefrom; and I hereby declare that the following is a full, clear, and exact description thereof, the proportions stated being those preferred by me; but I do not limit myself to these exact proportions, since they may be varied and yet my invention be practiced.

First, I take ninety gallons of water, which I heat to the desired temperature in any known manner, and in it I dissolve thirty pounds, or thereabout, of caustic soda or potash, the former being preferable for my purpose, although other alkaline bodies may be used; secondly, I take one hundred and fifty pounds of any resinous gum, such as rosin, gum-dammar, gum-copal, or shellac. This I melt in fifteen gallons of heated linseed or other oils, boiled or raw. This solution I add gradually to the alkaline solution above described, mixing them thoroughly, so that the saponification of the resinous gum and oil thus combined may take place as the mixing proceeds. When saponified, I add one hundred pounds Liverpool salt or any other salt, stirring the same well in until thoroughly dissolved; then filter the solution for the separation of the free alkali from the soap. I then place seventy pounds of the above soap in a suitable kettle, adding fifty gallons of cold water; then heat to boiling-point, and continue boiling until united. I then add to this three hundred pounds (more or less) of any suitable pigment, such as carbonate of lead, oxide of zinc, whiting, barytes, silicic acid, (pure silex,) feldspar, emery, infusorial earth, talc, clay, oxides of iron, ochers, starch, flour, ground corn, and chemically-manufactured colors or paint-pigments, ground or bolted. Boil the pigment and the seventy pounds of soap (plus the fifty gallons of water) well together until united. I then add to the solution any of the metallic salts—such, for example, as the salts of lead, of zinc, of copper, of alumina, or of manganese—the same being in a solution of about 24° Baumé, thereby precipitating the pigment combined with the metallic salt. I then pass the resulting compound through a filter, allowing the free liquor to run off. I then dry the mass, using any suitable apparatus heated by steam, dry heat, or in any other desired way until thoroughly dried. Then I take this dry material and grind it in any suitable oil or turpentine, or benzine, or otherwise prepare it as may best answer the various arts in which it may be used.

What I claim as my invention, and desire to secure by Letters Patent, is—

The within-described process of making paints, consisting in first forming a soap compound and boiling the same in water, then adding to the said mixture a pigment and boiling the mixture until the soap compound and pigment are united, then adding a metallic salt in a solution of about 24° Baumé to precipitate the pigment combined with the metallic salt, and subsequently drying the mass, after which the dry material may be prepared in oil for use, as and for the purposes set forth.

Signed at New York, in the county of New York and State of New York, this 29th day of June, A. D. 1883.

REVERE M. BREINIG.

Witnesses:
JOHN J. CAULDWELL,
WM. C. HICKS.